United States Patent [19]
Smedley et al.

[11] 3,895,206
[45] July 15, 1975

[54] RAILWAY VEHICLE SUSPENSION

[75] Inventors: Michael John Smedley, Coalville; Reginald Harrison, Oadby, both of England

[73] Assignee: Hitachi, Ltd; Kawasaki Steel Corporation, both of Japan

[22] Filed: Feb. 12, 1974

[21] Appl. No.: 441,893

[30] Foreign Application Priority Data
Feb. 20, 1973 United Kingdom................ 8166/73

[52] U.S. Cl. .............................. 105/199 F; 105/202
[51] Int. Cl................................................. B61f 5/02
[58] Field of Search ............ 105/199 F, 199 A, 202, 105/218 R, 224 R

[56] References Cited
UNITED STATES PATENTS
| | | | |
|---|---|---|---|
| 2,884,872 | 5/1959 | Boschi............................ | 105/224 R |
| 2,918,022 | 12/1959 | Kolesa et al. .................... | 105/224 R |
| 3,045,998 | 7/1962 | Hirst................................ | 105/199 F |
| 3,191,551 | 6/1965 | Hirst................................ | 105/199 F |
| 3,593,670 | 7/1971 | Aubert............................ | 105/199 F |
| 3,614,931 | 10/1971 | Adler.............................. | 105/199 A |

Primary Examiner—M. Henson Wood, Jr.
Assistant Examiner—John J. Love
Attorney, Agent, or Firm—Craig & Antonelli

[57] ABSTRACT

A freight vehicle having a bogie with a primary suspension having a stiffness which increases with applied load. A secondary suspension between the bogie and the vehicle body is of lower stiffness then the primary suspension and permits torsional movement of the suspension relative to the vehicle.

10 Claims, 4 Drawing Figures

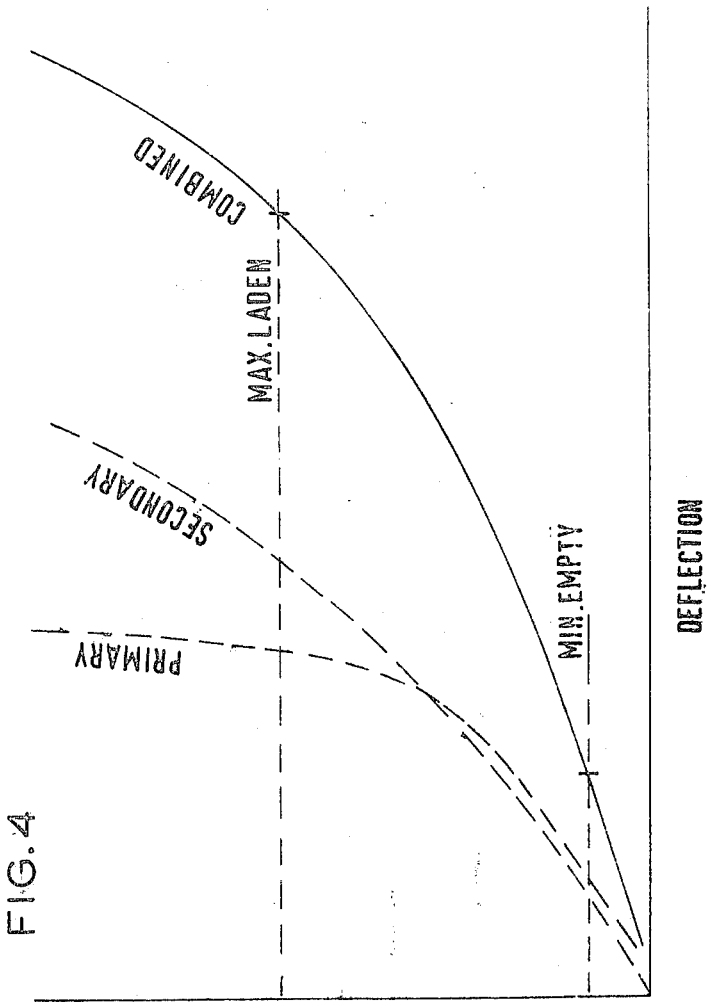

RAILWAY VEHICLE SUSPENSION

This invention relates to a railway vehicle suspension and in particular to a suspension suitable for freight vehicles.

For freight vehicles there is a great difference between the empty and laden weight of the vehicle (typically in a ratio of 1 to 4) and designing for such variations in weight is difficult. Furthermore with torsionally-rigid bodies, for example bulk liquid/powder carriers, it is necessary for the suspension to allow sufficient vertical movement to accommodate track irregularities which cannot be absorbed by torsional deflection of the vehicle body.

According to one aspect of the present invention a suspension for a railway vehicle comprises at least one bogie including a pair of solebars, a transom and two or more axle-sets each connected to the solebars by a primary suspension having in a direction substantially perpendicular to a plane containing axles of the axle-sets a stiffness which increases with applied load, and a lower stiffness secondary suspension comprising a pair of spring units one spring unit adjacent either end of the transom and each being inclined inwards with their ends furthest from the transom more closely spaced than the end at the transom, for supporting and locating a vehicle body relative to the bogie and to permit torsional movement of a vehicle body relative to the bogie.

The secondary spring units preferably are of the rubber-bonded-to-metal type and may include interleaving metal plates. The secondary spring units preferably are inclined so that the effective elastic center of the secondary suspension is approximately at the height of center of gravity of the vehicle body being supported when fully loaded.

The primary suspension preferably comprises conical rubber springs each having a non-linear vertical stiffness characteristic which increases as the applied load increases. Two such springs may conveniently be used at each end of each axleset between the axlebox and the solebar of the bogie.

Damping for the suspension is provided at least in part by inherent damping in the secondary springs. However, in some applications, additional damping may be provided by the use of external damper units connectable between the bogie and a vehicle body.

According to another aspect of the invention there is provided a railway vehicle having two bogies, one at either end of the vehicle body, and at least one bogie being attached to the vehicle body by means of the suspension as described above.

A locating link for connecting between the transom and vehicle body preferably is located along the longitudinal center-line of the vehicle body and attached by spherical bearings to the vehicle body and/or the transom. The spherical bearings may be rubber-lined.

In operation, when the vehicle is unladen, the primary springs provide a substantial proportion of the total vertical suspension flexibility. When the vehicle is laden the primary springs become relatively stiff and the secondary springs provide the larger proportion of the total vertical suspension flexibility.

Longitudinal forces such as arise between the vehicle body and the bogies during driving and braking are substantially all transmitted by means of the longitudinal link, and rotation of the bogie in the horizontal plane is allowed by shear deflection of the secondary springs.

Lateral location of the vehicle body is provided by the inclined secondary springs acting both in compression and shear.

Further aspects of the invention will become apparent from the following description of one embodiment of the invention described, by way of example, in conjunction with the accompanying drawings in which:

FIG. 4 shows typical primary, secondary and combined vertical stiffness suspension characteristics.

Figure 1:
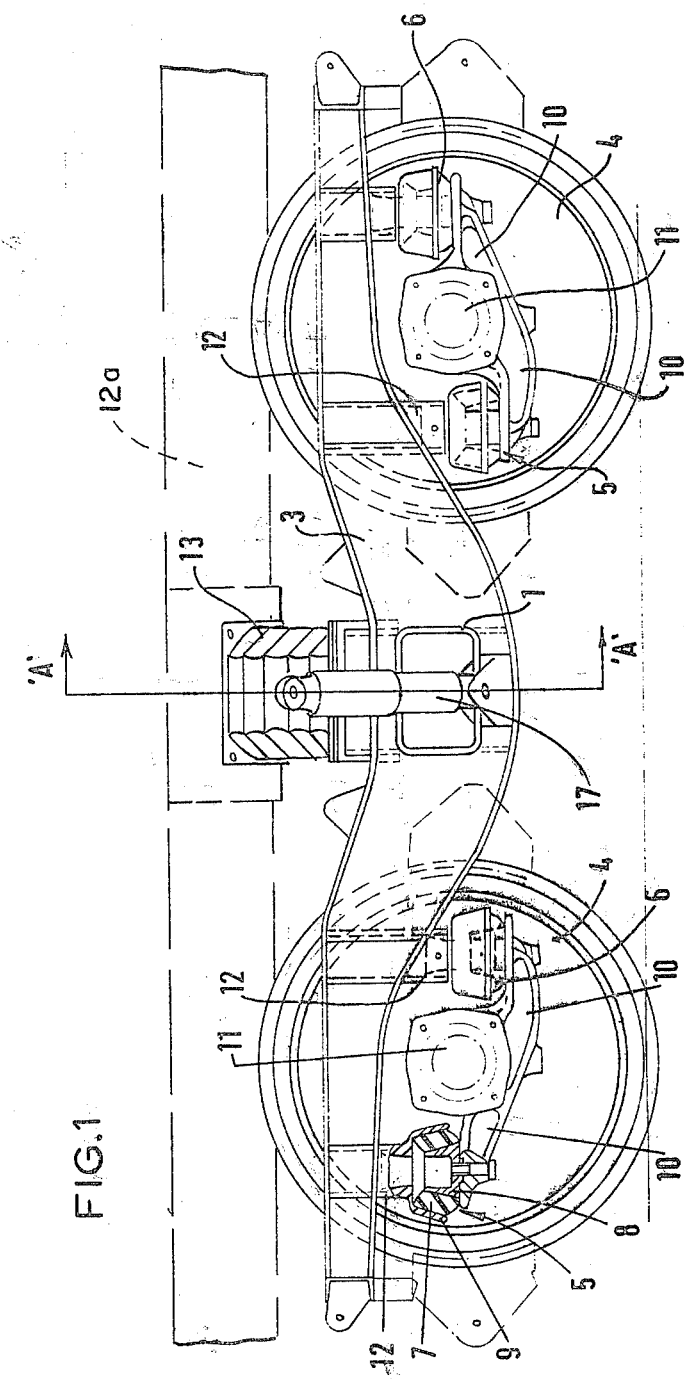
FIG. 1 is a side elevation of a vehicle bogie with one primary suspension spring sectioned.

The bogie illustrated in the drawings comprises a box-section transom 1 and a pair of solebars 2 and 3 welded one to either end of the transom 1.

A wheel and axleset 4 is mounted at each end of the bogie and is connected to the bogie solebars by a primary suspension which comprises a pair of conical rubber springs 5,6 for each end of each axleset 4. The springs 5,6 each comprise a conical rubber member 7 and conical inner and outer rigid mounting members 8 and 9. The inner mounting member 8 is bolted to an extension 10 provided on the axlebox 11 in which the axleset 4 runs and the outer mounting member 9 is attached to a downwardly projecting mounting lug 12 provided on the solebars 2,3 of the bogie.

The bogie is attached to a vehicle body 12a by a secondary suspension comprising two interleaved rubber-bonded-to-metal springs 13,14 attached one to each end of the transom 1. The springs 13,14 are inclined so that their compressive axes 'C' extend inwardly and upwardly with respect to the transom, with their compressive axes intersecting at an included angle of 60°. The top end plate of each spring 13,14 is attached to the underframe of the vehicle.

Figure 2:
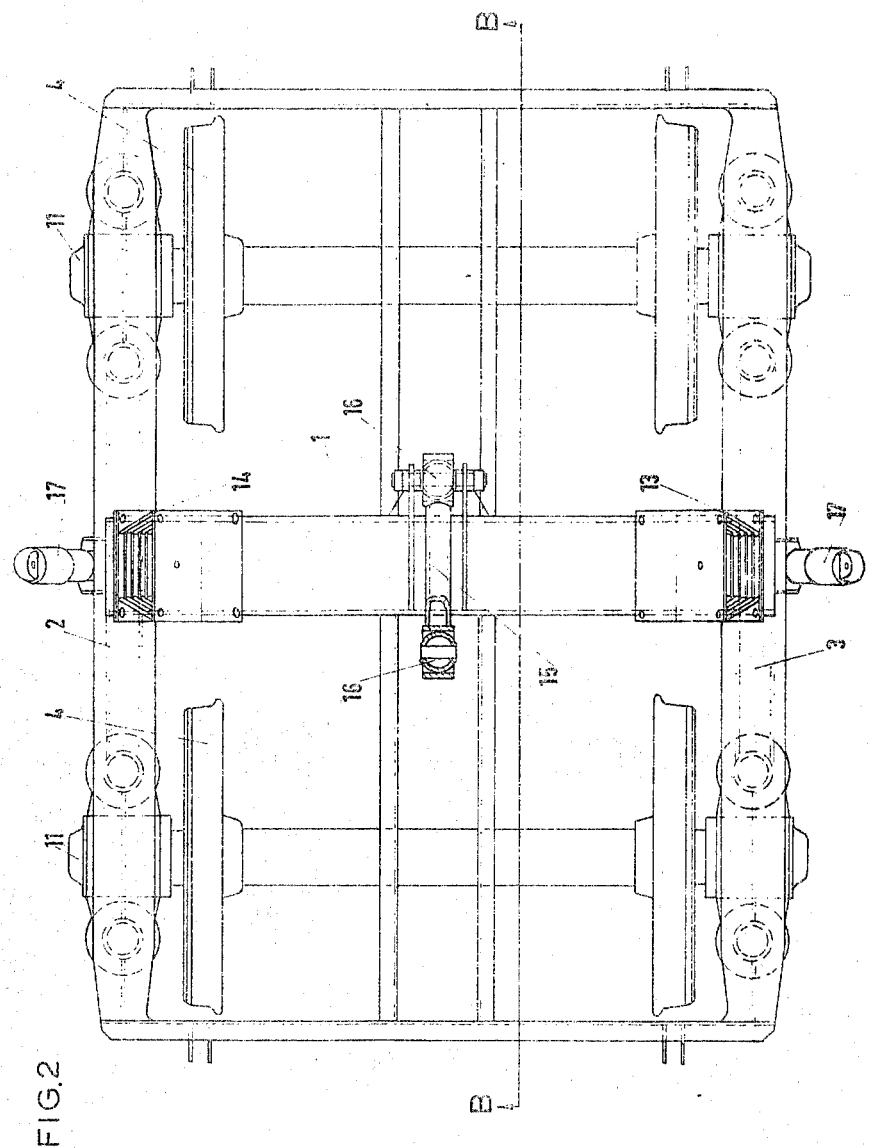
FIG. 2 is a plan view of the bogie of FIG. 1.

A longitudinal locating link 15 (see FIGS. 2 and 3) is attached at one of its ends to the center of the transom 1 and the other end is attached to the vehicle body 12a underframe. Both end connections are by means of spherical rubber-lined bearings 16.

The bogie is also shown with a pair of inclined external hydraulic dampers 17 in parallel with the secondary suspension. The bogie also has block brake gear of conventional form.

Bogie rotation in the horizontal plane is allowed by shear deflection of the secondary rubber springs 13,14. The effective position of the center of rotation of these springs relative to the vehicle body 12a is maintained by the longitudinal link 15.

The vertical suspension arrangement described has primary and secondary springs arranged in series and when the vehicle is unladen the primary springs provide a substantial proportion of the total vertical suspension flexibility. As the load increases, the stiffness of the primary springs increases until, at the laden condition, their proportional contribution to the total vertical suspension flexibility is substantially reduced. At the fully laden condition the secondary springs provide the larger proportion of the total vertical suspension flexibility. The primary, secondary, and combined vertical stiffness characteristics of the suspension described are shown in FIG. 5.

Figure 3:
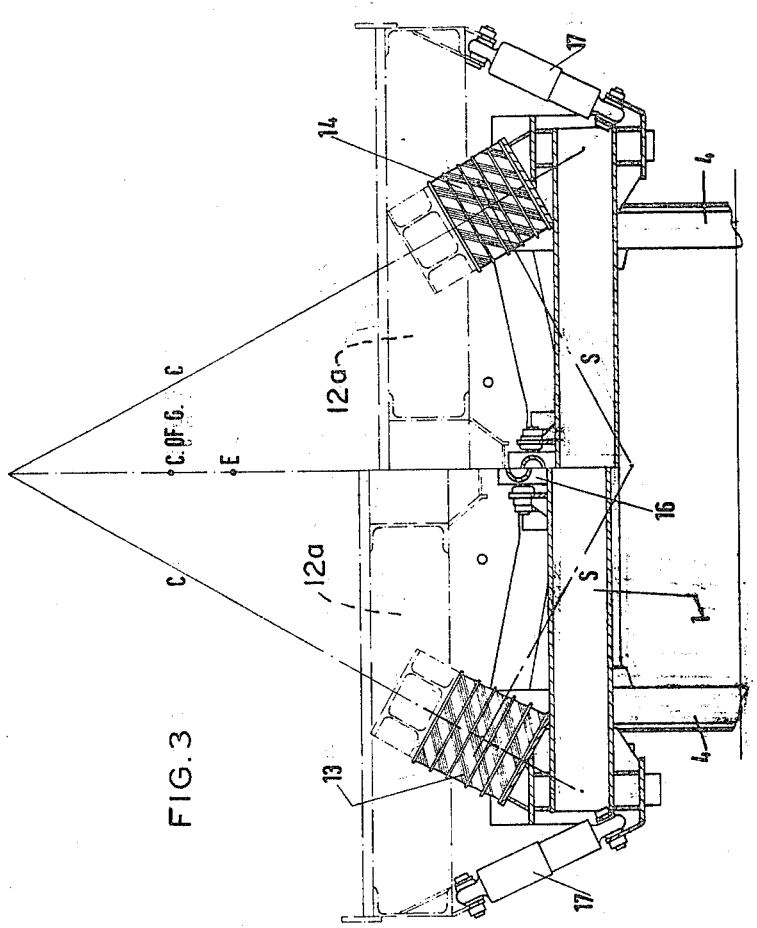
FIG. 3 is a cross-section of FIG. 1 taken on the line A—A of FIG. 1, the left-hand half showing the suspension as supporting an unloaded vehicle body and the right-hand half showing it supporting a loaded vehicle body.

The preferred spring geometry is shown in FIG. 3. In the laden condition shown there are only compression forces in the secondary springs. At greater or lesser vertical deflections, shear forces will also be present in the secondary springs, but as their magnitudes will be small, any resulting bending moments in the transom will also be small.

For flat slabs of rubber-bonded-to-metal plates, the compression stiffness is always greater than the shear stiffness. If a pair of similar springs are spaced apart with their compression axes C and shear axes S inclined to common central points as shown, there will be an elastic center E at an intermediate plane above the springs (see FIG. 3). At this elastic center, applied horizontal force will produce horizontal deflection but no rotation, and the torsional stiffness of the spring group is a minimum.

Ideally, the center of gravity of the vehicle body mass should lie in the same horizontal plane as the elastic center of the supporting springs. Similarly, the center of pressure of the vehicle body in side elevation should lie in the same horizontal plane. In both cases, this will seldom be possible, but the vertical offsets will be very much less with a suspension in accordance with the present invention than with conventional suspensions, where the elastic center of the springs may be up to 1 meter below the center of gravity or center of pressure.

A vehicle with a torsionally rigid body having, at either end, suspensions as described will negotiate twisted track with substantially improved wheel load equalization than may be achieved with conventional suspensions having comparable vertical stiffness.

The avoidance of a center pivot bearing assembly and the direct action of the secondary springs on the solebar and transom allows the bogie frame to be of lighter construction than in conventional bogies. Furthermore, primary springs do not require separate dampers and indeed for some applications there will be sufficient inherent damping within the rubber secondary springs to dispense with external dampers.

The suspension thus described provides a simple and effective vehicle suspension.

Having now described our invention, what we claim is:

1. A freight vehicle comprising a vehicle body and two bogie suspensions, each bogie suspension including a pair of sole bars, a transom, at least two axle sets each connected to the sole bars by a primary suspension, the primary suspension having in a vertical direction substantially perpendicular to a plane containing axles of the axle sets a stiffness which increases with applied load such that when the vehicle is unladen the primary suspension provides a substantial proportion of the total vertical suspension stiffness, and means to support and locate the vehicle body relative to the bogie and to permit torsional movement, with minimal torsional stiffness, of the vehicle body relative to the bogies about an axis extending in the longitudinal direction of the vehicle comprising a secondary suspension of lower stiffness than the primary suspension having a pair of spring units, one spring unit adjacent either end of the transom and each being inclined inwardly with their ends furthest from the transom more closely spaced than their ends at the transom.

2. A suspension according to claim 1 wherein the secondary suspension spring units comprise rubber-bonded-to-metal type springs.

3. A suspension according to claim 2 wherein the secondary suspension spring units comprise interleaved metal plates.

4. A suspension according to claim 1 wherein the stiffness of the primary suspension increases non-linearly with load.

5. A suspension according to claim 1 wherein the primary suspension comprises conical rubber springs.

6. A suspension according to claim 5 wherein two conical rubber springs are provided at each end of each axleset between the axleset and a solebar of the bogie.

7. A suspension according to claim 1 provided with at least one damper unit connectable to a vehicle body.

8. A vehicle according to claim 1 wherein a locating link extends perpendicular relative to the transom for connecting between the transom and vehicle body.

9. A vehicle according to claim 8 wherein the locating link is located along the longitudinal center-line of the vehicle body.

10. A vehicle according to claim 8 wherein the locating link is attached to the transom and/or the vehicle body by spherical bearings.

* * * * *

UNITED STATES PATENT OFFICE
CERTIFICATE OF CORRECTION

PATENT NO. : 3,895,206
DATED : July 15, 1975
INVENTOR(S) : Michael John Smedley

It is certified that error appears in the above-identified patent and that said Letters Patent are hereby corrected as shown below:

Please change the Assignee to read:

DUNLOP LIMITED,

England

Signed and Sealed this twenty-eight Day of October 1975

[SEAL]

Attest:

RUTH C. MASON
Attesting Officer

C. MARSHALL DANN
Commissioner of Patents and Trademarks